May 22, 1928.
L. CASALE
1,670,341
PROCESS FOR THE PREPARATION OF UREA FROM CARBONIC ANHYDRIDE AND SYNTHETIC AMMONIA
Filed June 11, 1925
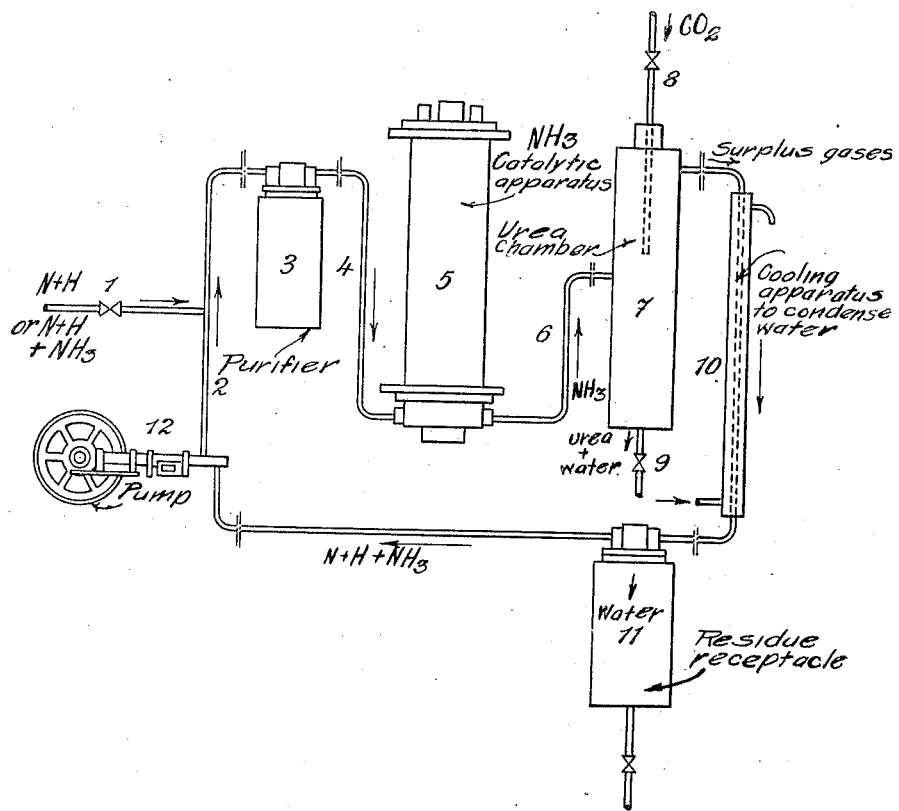

Patented May 22, 1928.

1,670,341

UNITED STATES PATENT OFFICE.

LUIGI CASALE, OF ROME, ITALY; MARIE CASALE SACCHI ADMINISTRATRIX OF SAID LUIGI CASALE, DECEASED.

PROCESS FOR THE PREPARATION OF UREA FROM CARBONIC ANHYDRIDE AND SYNTHETIC AMMONIA.

Application filed June 11, 1925, Serial No. 36,530, and in Italy December 23, 1924.

This invention relates to urea and to a method for preparing the same from ammonia and carbon dioxide or their immediate products of reaction. Such preparation of urea has recently been the subject of considerable study owing to the importance which the product might have in numerous fields of application.

For instance the temperatures at which the system

may reach its equilibrium have been well determined, and it was found that the condition begins to take place at about 150° C., while, at lower temperatures, down to 130° C., the transformation which would otherwise be too slow, can be accelerated by various catalysts.

It was ascertained that the percentage of urea in the above mentioned equilibrium system increases with the temperature, the formation of urea being accompanied by a considerable absorption of heat, and it was furthermore ascertained that the percentage of urea in the equilibrium is a function of the pressure of the system.

In all of the applications, so far tried, of said method for the preparation of urea, the procedure has been more or less as follows: In an autoclave under pressure carbamate of ammonium or carbon dioxide and ammonia in the required proportions are heated, with or without additions of catalyst, to a temperature above 130° C., the final product being removed from the autoclave after the transformation and the urea separated.

Continuous operation has also been suggested by gradually introducing into the autoclave at operating pressure, carbon dioxide and ammonia in quantities equivalent to the urea continuously removed from the apparatus.

The cost of this latter operation is obviously high, both as regards cost of installation and power required for heating and compression.

I have now found that the expense of supplying the necessary thermic energy may be dispensed with entirely, while the costs of both power for compression and of installation can be considerably reduced by grafting the production of urea on to the production of synthetic ammonia, that is to say by inserting an apparatus for making urea in an installation (preferably a closed circuit one) for the synthesis of ammonia. For example in an apparatus for the production of synthetic ammonia such as is described in U. S. Patents No. 1,478,549 and No. 1,478,550 the gaseous mixture leaving the catalytic tube contains a high percentage of ammonia at a temperature of about 250° C. and under a pressure of about 800 at. If compressed carbon dioxide is now introduced into this gaseous mixture at the aforesaid pressure, urea is rapidly obtained. The quantity of carbon dioxide to be introduced is proportioned according to the percentage of ammonia contained in the gases, but more advantageously in a quantity smaller than that corresponding to the equation above mentioned; the temperature of said carbon dioxide is then chosen in such a way that in the reaction chamber the temperature may range between 150° and 200° C.

The process of the invention therefore consists in causing the gaseous mixture obtained by catalytic synthesis of ammonia while it is still under the influence of pressure and heat to react with carbon dioxide gas, the urea being then separated from the reaction products from which the uncombined nitrogen-hydrogen mixture with or without ammonia is preferably recirculated in the process.

The accompanying drawing shows schematically and by way of example only, how the process of this invention may be carried into effect.

Referring to the drawing, the nitrogen-hydrogen mixture or even nitrogen-hydrogen-ammonia mixture previously compressed, is passed through the tube 1 and enters tube 2 where it meets a stream of uncombined nitrogen-hydrogen mixture or such mixture containing some ammonia circulating under the action of a pump 12. The resulting gaseous mixture passes then through a purifier 3 and by way of tube 4 enters a catalytic apparatus 5. The reaction product which now contains a high percentage of ammonia leaves the catalytic apparatus 5 by way of tube 6 and enters a chamber 7 which may contain a catalytic agent for accelerating the formation of urea, as for instance alumina, kaolin, silica and the like. Carbon dioxide is passed by way of tube 8 into the chamber 7 and this reacts with the hot ammoniacal gases forming urea. In the lower part of the chamber 7, which may be cooled, the urea condenses together with the water, simultaneously formed, to a liquid which can be drawn off through tube 9, while the gases flowing through the cooling apparatus 10 enter a receptacle 11 where the residual water, ammonium carbonate and ammonia are collected.

The uncombined hydrogen-nitrogen mixture or such mixture containing some ammonia leaving receptacle 11 is recirculated by means of pump 12 through tube 2.

It is advisable to use the carbon dioxide in quantity less than that established in the above mentioned equation of equilibrium, because in this way the gases are very easily and surely restored to the conditions required for proper operation of the apparatus for catalysis.

Claims—

1. The process of preparing urea which comprises reacting nitrogen and hydrogen together under conditions of heat and pressure to form a gaseous mixture containing ammonia, said mixture being at the elevated temperature and pressure of the ammonia-forming reaction and mixing carbon dioxide gas with said gaseous mixture without substantial diminution of the temperature and pressure thereof to form urea.

2. The process of preparing urea which comprises reacting nitrogen and hydrogen together under conditions of heat and pressure to form a gaseous mixture containing ammonia, said mixture being at the elevated temperature and pressure of the ammonia-forming reaction, approximately 150-250° C. and 800 atmospheres pressure, and mixing carbon dioxide gas with said gaseous mixture without substantial diminution of the temperature and pressure thereof to form urea.

In testimony whereof I have hereunto signed my name.

LUIGI CASALE.